United States Patent [19]
Avramidis

[11] Patent Number: 4,463,550
[45] Date of Patent: Aug. 7, 1984

[54] SILENT CHAIN

[75] Inventor: Stellios A. Avramidis, Mooresville, Ind.

[73] Assignee: PT Components, Inc., Indianapolis, Ind.

[21] Appl. No.: 304,517

[22] Filed: Sep. 21, 1981

[51] Int. Cl.³ .............................................. F16G 15/14
[52] U.S. Cl. ........................................ 59/84; 474/231
[58] Field of Search ................. 59/35 CP, 88, 91, 87, 59/84, 5, 8, 13; 474/330, 231, 234, 227, 226, 228

[56] References Cited

U.S. PATENT DOCUMENTS

| | | | |
|---|---|---|---|
| 2,869,379 | 1/1959 | Welser | 474/231 |
| 3,136,664 | 6/1964 | Kuntzmann | 474/231 |
| 3,153,348 | 10/1964 | Kuntzmann | 474/231 |

FOREIGN PATENT DOCUMENTS 581646  9/1958  Italy .................................. 474/230

Primary Examiner—Gene P. Crosby
Attorney, Agent, or Firm—Robert A. Brown

[57] ABSTRACT

A link set capable of connection in series to form an endless silent chain has a pair of guide links held apart by, and non-rotatively fastened to the ends of a pair of pins. A central link pack devoid of bushings to maximize the amount of material available to resist the stresses encountered under load is connected between and directly engages the pins. A pair of articulating link packs are rotatively connected to one of the pins on either side of the central link pack. Bushings are provided in the articulating packs to improve the wear life of the chain.

5 Claims, 2 Drawing Figures

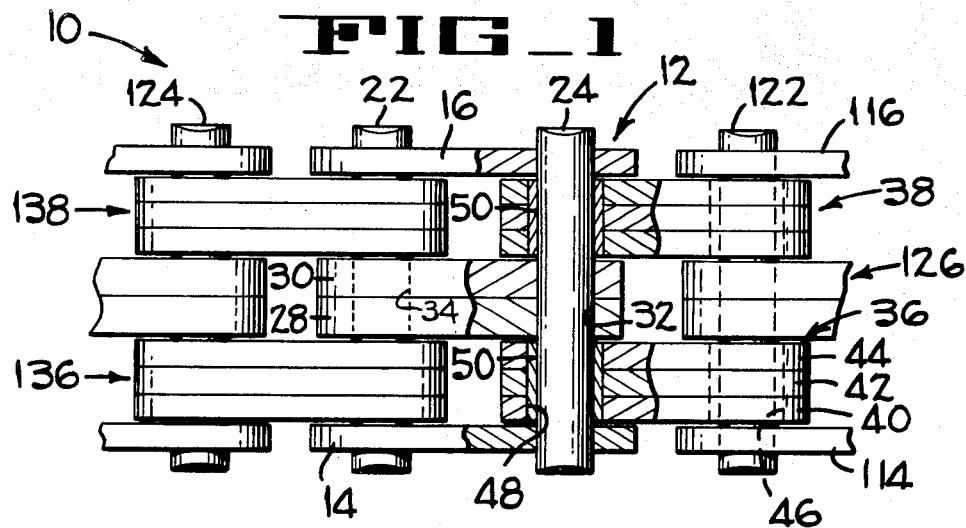
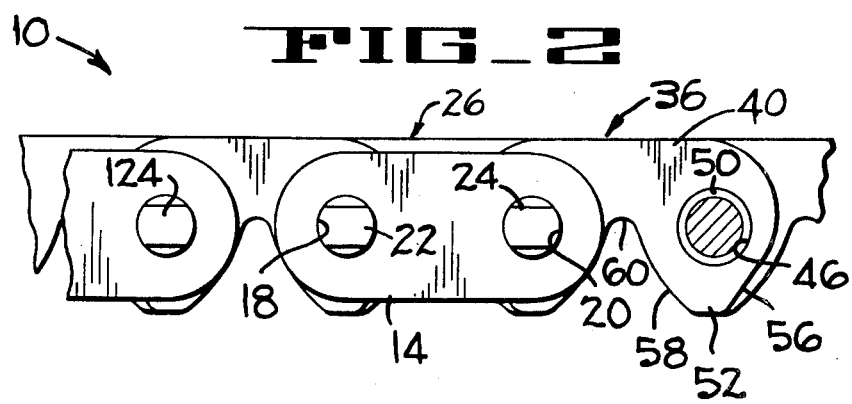

SILENT CHAIN

BACKGROUND AND SUMMARY OF THE INVENTION

Silent chains, such as timing chains, are subjected to complex stresses which characteristically are concentrated in a particular area of each link and are frequently not constant. The variations of stress level are caused by changes in direction of load application as the chain is trained around these sprockets, even though the load itself may remain constant, by forces resulting from accelleration or decelleration, and by changes in the load applied to the chain such as the torsional load fluctuation resulting from the firing sequence of the engine in which the timing chain is installed, which fluctuation becomes more pronounced with engines having four or fewer cylinders. The stresses will often result in fatigue failure of the chain through formation of a crack or separation developing between the link hole receiving the pin and either the inside or outside flank of an individual link. These loads imposed on the chain also cause accelerated wear of the articulating portions or bearing area of the chain which may result in wear failure. Thus, the strength of the individual links and the wear life must be maintained in order for the chain to function properly.

The economics of chain design also impose a couple of criteria; that the individual links of the chain must be made as cheaply as possible and the number of components required to make an endless chain be kept to a minimum. The most economical way of producing the link parts is by stamping, which process produces acceptable parts of adequate quality provided the thickness of the material from which they are stamped is within a limited range.

It is therefore, an object of the present invention to provide a silent timing chain which possesses adequate strength and long wear life.

It is also an object of this invention to provide such a chain which is assembled from a minimum number of parts.

It is another object of this invention to provide such a timing chain which is economical to produce and assemble.

These and other objects of the present invention and many of the attendant advantages thereof, will become more readily apparent upon perusal of the following description and the accompanying drawing, wherein;

FIG. 1 is a plan view of a silent chain according to the present invention with portions being broken away, and FIG. 2 is a side elevational view of the silent chain of FIG. 1 with portions being broken away.

DESCRIPTION OF A PREFERRED EMBODIMENT

Referring now to the drawing, there is shown a portion of a silent timing chain, indicated generally at 10, which is composed of a plurality of interconnected link sets, a complete one of which is shown at 12. The link set 12 consists of a pair of guide links 14 and 16, each of which has a pair of holes 18 and 20. The holes 18 and 20 are spaced apart to determine the pitch of the chain 10. Pins 22 and 24 are respectively pressed into the corresponding holes 18 and 20 of the guide links 14 and 16 so that the guide links and pins do not rotate relative to each other. A central link pack 26, composed of a pair of individual plain links 28 and 30 having a pair of aligned openings 32 and 34, is connected between the pins 22 and 24 and positioned centrally thereon. The diameter of the aligned holes 32 and 34 is slightly larger than the diameter of the pins 22 and 24 so that positioning of the links 28 and 30 on the pins 22 and 24 may be readily achieved. Since the pins 22 and 24 and the guide links 14 and 16 define a relatively rigid structure, there will be no relative rotation between the pins 22 and 24 and central link pack 26. Consequently, the need for a bearing surface for rotation is eliminated and the central link pack 26 serves only as a tensile member between the pins 22 and 24.

A pair of articulating link packs 36 and 38 are positioned on the pin 24 on either side of the central link pack 26. Link pack 36 is composed of three plain links 40, 42 and 44, as is the link pack 38. The links in the respective link packs 36 and 38 are provided with a pair of aligned holes 46 and 48 which are spaced apart with the distance between their centers being equal to the pitch spacing determined by the holes 18 and 20 in the guide links 14 and 16. A bushing 50 is pressed into each of the aligned holes 46 and 48 in each of the link packs. The pin 24 is rotatively received in the bushings 50 at one end of the link packs 36 and 38, while the bushings 50 at the other end of these link packs effect an articulated connection with the pin 122 of the adjacent link set on the right. Similarly the link packs 136 and 138, with their bushings 50, effect an articulated connection between the pin 124 of the other adjacent link set on the left and the pin 22 of the link set 12. The complete link set 12 then consists of the guide links 14 and 16, the pins 22 and 24, the central link pack 26 and the articulating link packs 36 and 38.

As is conventional, each of the plain links in the link packs 26, 36 and 38 are provided with a pair of teeth, such as shown in 52 and 54 on plain link 40 in FIG. 2, each of which define an outside flank 56 and an inside flank 58; the inside flanks 58 forming a crotch 60 therebetween. The provision of more material between the pins 22 and 24 and the flanks 56 and 58 in the links 28 and 30, which results from directly connecting these links to the pins 22 and 24, improves the strength of these links for any given thickness. As a consequence, the width or thickness of the central link pack 26 can be reduced and the width of the two link packs 36 and 38 increased, with correspondingly longer bushings 50 installed therein, (alternatively, only longer bushing may be installed without change in the width of the link packs 36 and 38, provided sufficient strength is available) to increase the bearing area for articulation in each link set. The increased bearing area will provide improved wear resistance without any loss of strength for any given overall width of chain. Since the envelope of a silent chain is often predetermined, e.g., the engine manufacturer will provide for a maximum width for a timing chain, it can be seen that the present invention provides for improved wear resistance, by maximizing the bearing area, without any loss of strength within such predetermined limits.

Another advantage of the present invention is the reduced number of parts necessary for each link set. The individual plain links are stamped, which is economical but generally limited to thicknesses of material between 0.060 and 0.080 inches in order to obtain holes with the quality necessary for bearing or bushing insert purposes. However, since the holes in the central link pack are not used as bearing surfaces, it is not necessary to attain the higher quality holes. Consequently, the central link pack 26 may be assembled from only two plain links, each having a thickness greater than would be permissible for bearing quality holes. For example, the plain links 28 and 30 may each be stamped from material of 0.085 inch thickness, which when assembled provides a link pack 26 having a width or thickness of 0.170 inches. The articulating link packs 36 and 38 may each contain plain links stamped from material of 0.060 inch thickness, which when assembled in three link, link packs have a thickness of 0.180 inches. Thus, the central link pack is composed of only two links providing the desired reduced number of parts and the necessary strength, while the articulating link packs are each composed of three links of relatively thin material to provide high quality holes but still providing the needed bearing surface for a longer wear life. The quality of the holes in even the articulating link packs 36 and 38 need not be as high as would be required if the links in these link packs were journaled directly on the pins because the bushings 50 provide the bearing surface for articulation.

While a preferred embodiment of the present invention has been shown and described herein, it will be appreciated that various changes may be made therein without departing from the spirit of the invention as defined by the scope of the appended claims.

What is claimed is:

1. A link set for assembly in series to form an endless silent chain comprising:
   guide link means having a pair of holes positioned to determine the chain pitch;
   a pair of pins non-rotatably secured to said guide link means;
   a plurality of first plain links grouped into first link pack means, the latter means having a first pair of openings sized and positioned to permit engagement of said openings directly with said pins;
   a plurality of second plain links grouped into second link pack means each second pack having a second pair of openings larger in diameter than said first pair of openings and positioned to be compatible with said pins; said plurality of said second plain links being greater than said plurality of said first plain links to provide an increased bearing area;
   a bushing secured in each of said second openings; and said second pack means positioned on either side of said first pack means with the bushings on one end of said second pack in articulating engagement with one of said pins and the other end extending away from the other of said pins, whereby said first pack means and said second pack means provide balanced strength from pitch to pitch throughout the length of the chain.

2. The invention according to claim 1;
   wherein the first link pack contains two plain links and each of the second link packs contains three plain links.

3. The invention according to claim 2 wherein the thickness of the plain links in the second link packs is in the range of 0.060 to 0.080 inches.

4. The invention according to claim 3 wherein the thickness of the plain links in the first link pack is equal to or greater than 0.085 inches.

5. The invention according to claim 4 wherein the overall thickness of said second link pack is greater than the overall thickness of said first link pack.

* * * * *